United States Patent [19]
Kanao

[11] 4,350,547
[45] Sep. 21, 1982

[54] FLEXIBLE HOSE

[76] Inventor: Shiro Kanao, 32-460 Nanpeidai, Takatsuki-shi, Osaka-fu, Japan

[21] Appl. No.: 245,292

[22] Filed: Mar. 19, 1981

Related U.S. Application Data

[60] Continuation of Ser. No. 120,204, Feb. 11, 1980, abandoned, which is a continuation of Ser. No. 924,409, Jul. 13, 1978, abandoned, which is a division of Ser. No. 776,034, Mar. 9, 1977, abandoned.

[30] Foreign Application Priority Data

May 13, 1976 [JP] Japan .................................. 51-54883

[51] Int. Cl.³ .......................................... B29D 23/12
[52] U.S. Cl. .................................... 156/143; 138/122; 138/126; 138/132; 138/144; 138/173
[58] Field of Search ........................ 156/195, 143–144, 156/425, 428–430, 244.13, 244.15; 138/122, 126, 132, 125, 129, 144, 173

[56] References Cited

U.S. PATENT DOCUMENTS

| | | | |
|---|---|---|---|
| 3,047,026 | 7/1962 | Kahn | 138/122 |
| 3,362,434 | 1/1968 | Medford et al. | 138/122 |
| 3,840,181 | 6/1975 | Stent et al. | 156/143 |
| 3,919,026 | 11/1975 | Mizutani et al. | 156/143 |

*Primary Examiner*—David A. Simmons
*Attorney, Agent, or Firm*—Edwin E. Greigg

[57] ABSTRACT

A method of making a flexible hose comprising a hose main body formed from a rubber strip wound into helical coils rigidly joined together and a linear reinforcement of rigid resin disposed in contact with the strip in a manner to have a thickness between the reinforcement and the inner surface of the helically wound strip. The reinforcement is bonded to the integral homogeneous rubber portion of the strip.

8 Claims, 3 Drawing Figures

4,350,547

FLEXIBLE HOSE

This is a continuation of Ser. No. 120,204 filed Feb. 11, 1980, now abandoned, which is a continuation of Ser. No. 924,409 filed July 13, 1978, now abandoned, which is a division of Ser. No. 776,034 filed Mar. 9, 1977, now abandoned.

BACKGROUND OF THE INVENTION

The present invention relates to a flexible hose comprising a peripheral rubber wall and a linear reinforcement of rigid resin for reinforcing the rubber wall.

Generally rubber hoses reinforced with a rigid resin linear reinforcement are more advantageous in resistance to oil, to heat and to abrasion than hoses comprising a peripheral wall of soft polyvinyl chloride resin reinforced with a helical linear reinforcement of rigid polyvinyl chloride resin because of the properties of rubber. With hoses of the latter type, the plasticizer contained in the soft polyvinyl chloride resin tends to migrate into the rigid polyvinyl chloride resin, reducing the rigidity required of the reinforcement and resulting in cracks in the reinforcement, whereas rubber hoses are free of such degradation attributable to the plasticizer but it is extremely difficult and industrially not feasible to ensure a rigid bond between the dissimilar materials used, namely between the rubber and the rigid resin.

A method has been proposed of producing rubber hoses by helically winding a rigid resin linear reinforcement around an unvulcanized rubber tube, covering the reinforced tube with a layer of unvulcanized rubber or with a fabric impregnated with unvulcanized rubber, and heating the resulting assembly for vulcanization to intimately join the inner and outer rubber layers together and to fuse the reinforcement to the two rubber layers with the heat of vulcanization. However, this method gives no consideration to strengthen the bond between the rubber and the rigid resin which are inherently difficult to bond together. In fact, the reinforcement is merely interposed between and held by the inner and outer rubber layers by virtue of the rubber-to-rubber bond of the two layers. Futher because the inner rubber layer, the reinforcement and the outer rubber layer are not produced at the same time and because the reinforcement is gripped between the inner and outer rubber layers, it is difficult to wrap up the reinforcement with homogeneous rubber over the entire periphery thereof, and a weak point is liable to occur on the peripheral surface of the reinforcement at the interface between the inner and outer rubber layers.

These objections invariably lead to the drawback that when the hose is repeatedly bent and deformed, the reinforcement tends to separate from the surrounding rubber portion, failing to afford the contemplated pressure resistance, tensile strength and like reinforcing effects. Thus, it has been desired to remedy this drawback.

The present invention has overcome such problem.

SUMMARY OF THE INVENTION

The flexible hose of this invention comprises a hose main body formed from a rubber strip wound into helical coils rigidly joined together, and a linear reinforcement of rigid resin disposed in contact with the strip in a manner to have a thickness between the reinforcement and the inner surface of the helically wound strip, each of the strip and the reinforcement being approximate to the other in solubility parameter of its material, at least a portion of the reinforcement being bonded to the integral homogeneous rubber portion of the strip.

According to this invention, the flexible hose is formed from a strip of rubber and a linear reinforcement of rigid resin, the rubber and the rigid resin being approximate to each other in solubility parameter. The linear reinforcement is bonded to the integral homogeneous rubber portion of the strip. Consequently, the increased bonding strength between the hose main body and the reinforcement gives the hose improved toughness although the hose is lightweight, rendering the hose serviceable free of the drawback that repetition of bending and deformation of the hose would readily cause separation between the hose main body and the reinforcement to reduce the desired pressure resistance, tensile strength and like reinforcing effects to be given by the reinforcement. This tough and light hose can be manufactured at low cost because its major portion is rubber. Further, since it has a rubber inner surface, little static electricity will be generated by an object passing therethrough. Thus, the invention has realized a novel and efficient hose characterized by a good combination of the advantages of rubber and rigid resin.

An object of this invention is to provide a flexible hose in which a linear reinforcement is bonded to the surrounding rubber portion and retains the desired reinforcing effects.

Another object of this invention is to provide a flexible hose which is tough, lightweight and inexpensive to make.

Other objects and benefits of this invention will become apparent from the following description.

DESCRIPTION OF THE PREFERRED EMBODIMENT

An embodiment of this invention will be described below in detail with reference to the accompanying drawings.

Figure 1:
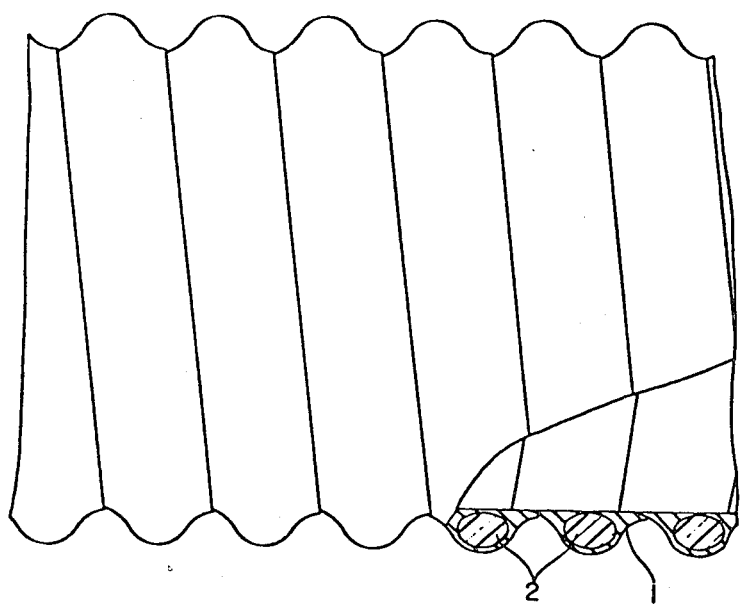
FIG. 1 is a front view partly broken away to show an embodiment of the flexible hose of this invention.

FIG. 1 shows a flexible hose of this invention comprising a hose main body 1 formed from a rubber strip 3 wound into helical coils which are rigidly joined together. A linear reinforcement 2 of rigid resin is embedded in a thick portion of the strip 3. The reinforcement 2 is made of rigid polyvinyl chloride resin, while the strip 3 is prepared predominantly from nitrile rubber which is approximate to the rigid polyvinyl chloride resin in solubility parameter. The strip 3 enclosing the reinforcement 2 is integral and homogeneous over the entire periphery of the reinforcement 2 and is rigidly bonded to the reinforcement 2 over the entire periphery thereof.

The hose main body 1 is made, for example, from the following composition:

| Nitrile rubber | 70 parts |
| SBR | 30 parts |
| Carbon | 70 parts |

| | |
|---|---|
| -continued | |
| Softener | 20 parts |
| Vulcanizing agent | 1.5 parts |
| Other additives | Small amounts |

The linear reinforcement 2 is made, for example, from rigid polyvinyl chloride resin as already stated.

Figure 2:
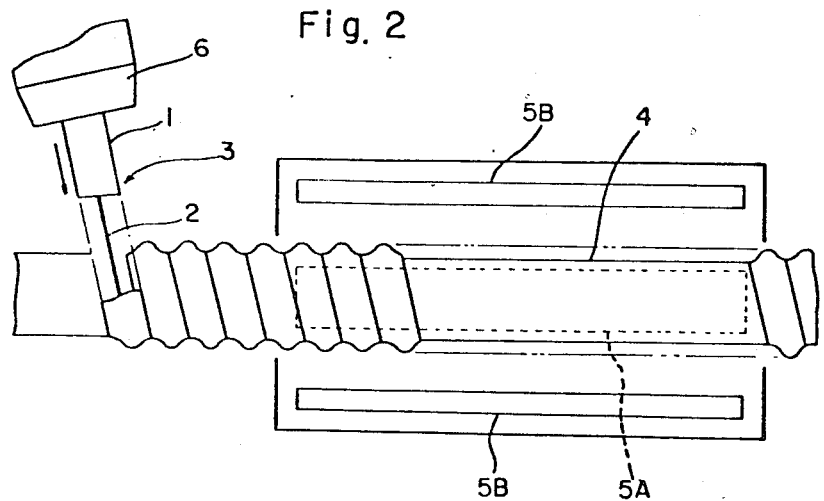
FIG. 2 is a schematic diagram showing a method of producing the hose.

An exemplary method of producing the flexible hose will be described below. With reference to FIG. 2, a strip 3 containing a vulcanizing agent and having a rigid resin linear reinforcement 2 embedded in its thick portion is extruded and helically wound onto a former 4. While being sent toward a given direction by the former 4, the wound strip 3 is vulcanized by being continuously heated from inside and outside at the same time by heaters 5A and 5B disposed inside and outside the former 4 respectively and is thereafter cooled to room temperature. Within the extruder, the reinforcement 2 is maintained at about 130° to 180° C. and the hose main body 1 at a temperature of up to about 60° C. When extruded from the die 6 into the atmosphere, the body 1 incorporating the reinforcement 2, namely the strip 3, is maintained at about 100° C. The vulcanization is conducted at an elevated temperature of about 170° to 220° C. The internal pressure of the die 6 is 100 to 200 kg/cm².

It has been found that when extruded into the strip 3 by the above method, the nitrile rubber, the main component of the main body 1, and the rigid vinyl chloride forming the reinforcement 2 are very effectively bonded together over the entire periphery of the reinforcement 2 and that the flexible hose obtained as a finished product has an outstanding bond between the main body 1 and the reinforcement 2.

This is due to the fact that the rigid polyvinyl chloride resin and the nitrile rubber are approximate to each other in solubility parameter. The increased bonding strength between the two materials appears to be attributable also to the integral extrusion to which the materials are subjected in a molten state at an elevated temperature and at pressure of 100 to 200 kg/cm².

When polypropylene or polyethylene is used for the rigid resin linear reinforcement 2, it is preferable to use ethylene-propylene terpolymer or butyl rubber as the hose main body 1 in view of the solubility parameter.

Figure 3:
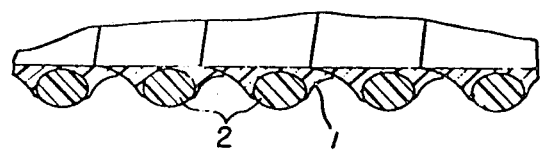
FIG. 3 is a front view partly broken away to show another embodiment of the flexible hose of this invention.

Although FIGS. 1 and 2 show reinforcement 2 completely embedded in strip 3, a desired result may be obtained otherwise; it is possible to have a portion of reinforcement 2 embedded in strip 3 and the remaining portion protruding from strip 3, as shown in FIG. 3. In other words, the object of this invention is achieved by disposing reinforcement 2 in contact with strip 3 in a manner to have a thickness between reinforcement 2 and the inner surface of helically wound strip 3 with at least a portion of reinforcement 2 bonded to the integral homogeneous rubber portion of strip 3.

What is claimed is:

1. A method of making a flexible hose having a peripheral rubber wall and a linear reinforcement of rigid resin for reinforcing the rubber wall, which comprises the steps of selecting a rubber material and a rigid resin material which are approximate to each other in solubility parameter;

integrally extruding a mass of the rubber material in an uncured state and a mass of the rigid resin material in a molten state to form a composite strip of the rubber material and a linear reinforcement of the rigid resin material which is at least partially embedded in the rubber material and which extends along the length of the strip;

winding the strip helically about a mandrel with rubber side edges of adjacent convolutions of the strip being disposed in overlapping engagement; and heating the strip disposed about the mandrel to cure the rubber material of the strip;

whereby the rigid resin material of the reinforcement is effectively bonded to the rubber material over the entire portion of the reinforcement periphery in contact with the rubber material, and adjacent convolutions of the strip are bonded together along the overlapping engaged rubber side edges of these adjacent convolutions, so as to form the flexible hose.

2. A method of making a flexible hose, as described in claim 1, wherein the selected rigid resin material is a rigid polyvinyl chloride resin, and the selected rubber material is a nitrile rubber compound.

3. A method of making a flexible hose, as described in claim 2, wherein said rubber material includes approximately 70 parts of nitrile rubber, 30 parts of SBR, 70 parts of carbon, 20 parts of softener, and 1.5 parts of a vulcanizing agent.

4. A method of making a flexible hose, as described in claim 2, wherein;

prior to the extrusion step, the molten rigid resin material is maintained at a temperature in the range of 130° C. to 180° C., and the uncured rubber material is maintained at a temperature not exceeding approximately 60° C.;

during the extrusion step, the molten rigid resin material and the uncured rubber material are subjected to a pressure in the range of 100 kg/cm² to 200 kg/cm²; and during the strip heating step, the strip is heated to a temperature in the range of 170° C. to 220° C., to effect vulcanization of the rubber material.

5. A method of making a flexible hose, as described in claim 1, wherein said rigid resin material is polypropylene or polyethylene, and said rubber material is ethylene-propylene terpolymer or butyl rubber.

6. A method of making a flexible hose, as described in claim 1, wherein the linear reinforcement is completely embedded within the rubber material of the strip formed during the extrusion step, whereby the entire periphery of the linear reinforcement is effectively bonded to the rubber material surrounding the reinforcement.

7. A method of making a flexible hose, as described in claim 1, wherein only a portion of the periphery of the linear reinforcement is embedded in, and effectively bonded to, the rubber material of the strip formed during the extrusion step, with the remaining portion of the reinforcement periphery protruding from the rubber material of the strip.

8. A method of making a flexible hose, as described in claim 1, wherein the heating step is carried out by applying heat to both the inner and outer surfaces of the helically-wound strip.

* * * * *